C. H. BIGGIN.
LUBRICATOR.
APPLICATION FILED MAY 31, 1916.

1,220,719.

Patented Mar. 27, 1917.

Inventor
Charles H. Biggin,
by Hazard Berry & Miller
Atty's

UNITED STATES PATENT OFFICE.

CHARLES H. BIGGIN, OF REDLANDS, CALIFORNIA.

LUBRICATOR.

1,220,719.  Specification of Letters Patent.  Patented Mar. 27, 1917.

Application filed May 31, 1916. Serial No. 100,916.

*To all whom it may concern:*

Be it known that I, CHARLES H. BIGGIN, a citizen of the United States, residing at Redlands, in the county of San Bernardino and State of California, have invented new and useful Improvements in Lubricators, of which the following is a specification.

This invention relates to lubricators.

One of the objects of the invention is to provide an improved lubricating device which may be attached to the end of a shaft bearing over the end of the shaft, and operated by hand to force a lubricant through the bearing as conditions require.

Another object of the invention is to provide a lubricating device of this character adapted to screw on the end of a shaft bearing and provided with means to prevent dirt entering the screw threads between the device and the bearing and causing the device to tighten on the bearing, whereby the device is enabled to be turned freely on the bearing and more effectively to keep the dirt out of the bearing.

Other objects will appear from the following description.

The invention is illustrated in the accompanying drawing, forming a part of this specification in which.

Figure 1:
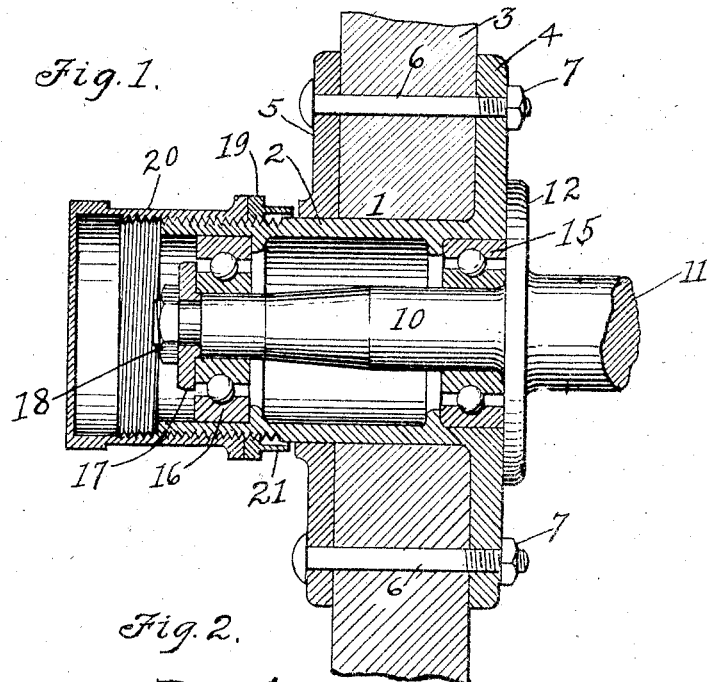
Figure 1 is a longitudinal section of the hub and journal of an automobile wheel and my improved lubricator which is attached to said hub.
Figure 2:
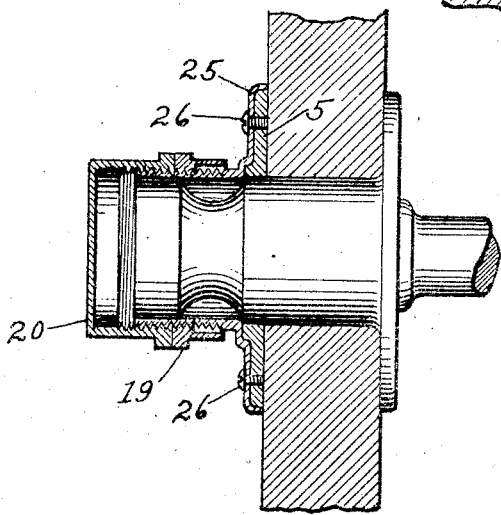
Fig. 2 is a view of an automobile hub and journal and a modified form of the lubricator attached thereto, the lubricator being shown in section.

Referring to Fig. 1 in the drawing, 1 indicates the hub of an automobile wheel, which comprises a cylindrical hub casing 2, against which the inner ends of the spokes 3 of the wheel abut, and an annular flange 4 integral with the inner end of the hub casing, which flange rests against the inside of said spokes. A washer 5 slips over the outer end of the hub casing against the outside of the spokes 3 and the spokes are clamped between said flange 4 and washer 5 by bolts 6 which extend through the plates and nuts 7 which screw on the ends of said bolts against the flange 4. A journal 10 on the end of the wheel axle 11 extends into the hub, and an annular flange 12 is provided on the end of the axle which flange is adapted to rest against the hub flange 4.

Ball bearings 15 and 16 are provided between the journal and the hub casing at the inner and outer ends of the journal, respectively, upon which bearings the hub and wheel rotate. The hub and wheel are held on the journal by a washer 17 which fits over the outer end of the journal against the bearing 16 and a nut 18 which screws on the outer threaded end of the journal against said washer. The outer end of the hub casing is threaded externally to receive a lock nut 19 and an internally threaded cap 20, the lock nut being adapted to screw against the inner end of the cap to lock the cap in the desired position on the end of the hub casing. An inwardly extending annular flange 21 is provided on the lock nut 19 which flange extends over the inner end of the external thread on the end of the hub casing and prevents dirt entering said thread and the internal cap thread and causing the cap to tighten on the hub casing, thus enabling the cap to be screwed freely on by hand on the end of the hub casing in either direction and more effectively keeping dirt out of the bearing.

In operation, the hub is filled with a lubricant such as hard oil and the lubricant is placed within the cap 20 and the cap is screwed on the end of the hub casing by hand, so that the lubricant completely fills the hub and the cap. The lock nut 19 is then screwed against the end of the cap so as to lock the cap on the hub casing. As the wheel turns on the journal 10, the oil gradually works its way out between the axle flange 12 and the hub flange 4 out of the inner end of the hub casing. The lock nut is screwed away from the cap to free the cap and the cap is then screwed inwardly on the hub casing so as to force lubricant into the hub and again fill the hub and the cap with lubricant. The lock nut is then screwed against the cap, locking the cap on the hub casing. As the cap is screwed inwardly on the hub casing, fresh lubricant is forced into the ball bearings and the used lubricant and such material as may be worn from the bearings is forced out of the bearings and any material which may have a tendency to enter the hub from the outside is forced between the axle flange 12 and hub flange 4 out of the hub.

In the modified form of the lubricator the cap 20 and lock nut 19 are screwed on an externally threaded sleeve which slips over the outer end of the hub and has an annular flange 25 at its inner end which flange is secured, as by means of screws 26 to the hub washer 5. The sleeve is used on this form of hub because the configuration thereof is such that a thread could not be cut thereon suitable to receive the lock nut and cap.

Figure 3:
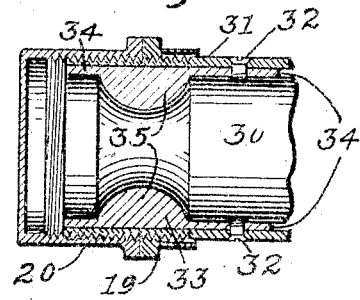
Fig. 3 is a view of a bearing and another modified form of the lubricator attached thereto; the lubricator being shown in section.

In the modification illustrated in Fig. 3, the configuration of the bearing 30 is also such that a thread could not be cut thereon suitable to receive the lock nut and the cap. In this form of lubricator, an externally threaded sleeve 31 of larger diameter than that of the bearing is slipped over the end of the bearing and secured thereto by screws 32. Molten Babbitt-metal 33 is then poured into the spaces 34 and 35 between the hub and the sleeve and when the Babbitt metal hardens the sleeve is solidly mounted thereby on the hub. The lock nut 19 and cap 20 screw on the externally threaded sleeve 31.

I claim:

1. In combination with a hub, a cap screwing on the end of the hub, and a lock nut having an annular flange on the rear thereof screwing on the hub against said cap to lock said cap in the desired position on said hub, and an annular flange on the rear of said lock nut preventing dirt entering the threads between said hub and said cap.

2. In combination with a hub, a cap screwing on the end of said hub, a lock nut screwing on said hub against said cap to lock said cap in the desired position on said hub said lock nut having means for preventing the entrance of dirt into the threads between said hub and said cap.

3. In combination with a hub, a lubricating device adjustably mounted on the end of said hub, said hub and said lubricating device being adapted to be filled with a lubricant, said lubricating device being adapted to be adjusted by hand on said hub so as to force the lubricant through the hub, means for locking said lubricating device in adjusted position and to prevent dirt entering and interfering with the free operation of said lubricating device.

In testimony whereof I have signed my name to this specification.

CHARLES H. BIGGIN.